United States Patent
Chang et al.

(10) Patent No.: US 8,996,520 B2
(45) Date of Patent: Mar. 31, 2015

(54) RANKING OF NATIVE APPLICATION CONTENT

(71) Applicant: Google Inc., Mountain View, CA (US)

(72) Inventors: Lawrence Chang, Foster City, CA (US); Chaesang Jung, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 13/837,316

(22) Filed: Mar. 15, 2013

(65) Prior Publication Data

US 2014/0280234 A1  Sep. 18, 2014

(51) Int. Cl.
*G06F 17/30* (2006.01)

(52) U.S. Cl.
CPC .............................. *G06F 17/30864* (2013.01)
USPC ............. 707/736; 707/748; 707/749; 706/12; 706/13; 706/14

(58) Field of Classification Search
None
See application file for complete search history.

(56) References Cited

U.S. PATENT DOCUMENTS

| | | | |
|---|---|---|---|
| 7,617,225 B2 | 11/2009 | Arrouye | |
| 8,086,957 B2 | 12/2011 | Bauchot | |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |
| 2004/0030882 A1 | 2/2004 | Forman | |
| 2005/0177562 A1 | 8/2005 | Raciborski | |
| 2007/0209080 A1 | 9/2007 | Ture | |
| 2009/0150363 A1 | 6/2009 | Gross et al. | |
| 2010/0082661 A1 | 4/2010 | Beaudreau | |
| 2010/0257466 A1 | 10/2010 | Wroblewski | |
| 2010/0306191 A1 | 12/2010 | LeBeau | |
| 2011/0252038 A1 | 10/2011 | Schmidt | |
| 2011/0307463 A1 | 12/2011 | Kasterstein et al. | |
| 2011/0314004 A1 | 12/2011 | Mehta | |
| 2012/0124061 A1 | 5/2012 | Macbeth | |
| 2012/0179706 A1 | 7/2012 | Hobbs | |
| 2012/0179955 A1 | 7/2012 | French | |
| 2012/0254776 A1 | 10/2012 | Corella et al. | |
| 2012/0290584 A1 | 11/2012 | De Bona et al. | |
| 2012/0316955 A1 | 12/2012 | Panguluri | |
| 2012/0323898 A1 | 12/2012 | Kumar | |

(Continued)

FOREIGN PATENT DOCUMENTS

| | | | |
|---|---|---|---|
| EP | 2474905 A2 | 7/2012 | |
| EP | 2495670 A1 | 9/2012 | |

OTHER PUBLICATIONS

International Search Report and Written Opinion in International Application No. PCT/US2014/011256, mailed Apr. 15, 2014, 12 pages.

(Continued)

*Primary Examiner* — Angelica Ruiz
(74) *Attorney, Agent, or Firm* — Fish & Richardson P.C.

(57) ABSTRACT

Methods, systems, and apparatus, including computer programs encoded on a computer storage medium for normalizing native application scores. In an aspect, a system ranks web resources and native applications based on web resource scores and normalized native application scores that are normalized to the web resource scores. The ranking is indicative of the relevance of each web resource and native application for a search operation relative to each other web resource and native application.

19 Claims, 4 Drawing Sheets

(56) References Cited

U.S. PATENT DOCUMENTS

| | | | |
|---|---|---|---|
| 2013/0006897 | A1 | 1/2013 | Jain |
| 2013/0007821 | A1* | 1/2013 | Berkowitz .................... 725/105 |
| 2013/0110815 | A1 | 5/2013 | Tankovich |
| 2013/0111328 | A1 | 5/2013 | Khanna |
| 2013/0122861 | A1 | 5/2013 | Kim |
| 2013/0124606 | A1 | 5/2013 | Carpenter |
| 2013/0191360 | A1 | 7/2013 | Burkard |
| 2013/0232256 | A1 | 9/2013 | Lee |
| 2013/0298007 | A1 | 11/2013 | Cullen |
| 2013/0325856 | A1 | 12/2013 | Soto |

OTHER PUBLICATIONS

Google Play Store [online]. [retrieved on Mar. 11, 2013]. Retrieved from the Internet: <URL: https://play.google.com/store>, 3 pages.
"Visability for Your Apps/Android Developers" Developer.Andriod.com [online]. [retrieved on Mar. 11, 2013]. Retrieved from the Internet: <URL: http://developer.android.com/distribute/googleplay/about/visibility.html>, 6 pages.
Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.
"Deeplink.me Lets Mobile Users Navigate Through a "Web" of Apps," [online][Retrieved on Dec. 13, 2013]; Retrieved from the Internet URL: techcrunch.com/2013/05/22new-service-called-deeplink-me-will-let-mobile-users-navigate-through-a-web-of-apps/; 8 pages.
"Google's Search Results Can Deep-Link to Your Android Apps," [online] [Retrieved on Dec. 13, 2013]; Retrieved from the Internet URL: techcrunch.com/2013/10/31/android-4-4-kitkat-app-indexing/; 6 pages.
"How to get a deep link of my application from the Windows Phone Marketplace using .NET code?," [online] [Retrieved on Dec. 13, 2013]; Retrieved from the Internet URL: stackoverflow.com/questions/13639564/how-to-get-a-deep-link-of-my-application-from-the-windows-phone-marketplace-usin; 2 pages.
"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.
"Instant Pages on Google Chrome," [online] [Retrieved on Dec. 16, 2013]; Retrieved from the Internet URL: chrome.blogspot.jp/2011/instant-pages-on-google-chrome.html; 3 pages.
"Mobile deep linking," [online] [Retrieved on Dec. 13, 2013]; Retrieved from the Internet URL: en.wikipedia.org/wiki/Mobile_deep_linking; 2 pages.
"Ready for a "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.
"Adding deep linking to Google+ posts shared from your iOS app," [online][Retrieved on Jan. 7, 2014]; Retrieved from the Internet URL: https://developers.google.com/+/mobile/ios/share/deep-link; 3 pages.
"App Linking," [online][Retrieved on Jan. 7, 2014]; Retrieved from the Internet URL: https://developers.facebook.com/docs/android/link-to-your-native-app/; 14 pages.
"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.
"Frequently Asked Questions—General Information," [online][Retrieved on Jan. 7, 2014]; Retrieved from the Internet URL: https://linksmanager.com/Frequently+Asked+Questions+-+General+Information; 8 pages.
"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.
"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.
"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.
"Sharing to Google+ from your Android app," [online][Retrieved on Jan. 7, 2014]; Retrieved from the Internet URL: https://developers.google.com/+/mobile/android/share/#handling_incoming_deep_links; 2 pages.

* cited by examiner

RANKING OF NATIVE APPLICATION CONTENT

BACKGROUND

This specification describes technologies relating to scoring and ranking native application content relative to web page resources.

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular web page resources accessible over the Internet. With the advent of tablet computers and smart phones, native applications that facilitate the performance of the same functions facilitated by the use of web page resources are now being provided in large numbers.

A user's informational need may thus be satisfied by providing search results that identify either one (or both) of a particular web page resource or a native applications that facilitates the performance of the same functions facilitated by web page resource, or presents the same or very similar information as the web page resource.

SUMMARY

In general, one innovative aspect of the subject matter described in this specification can be embodied in methods that include the actions of receiving, by a data processing apparatus, web resource scores, each web resource score corresponding to a web resource and being a measure of a relevance of the web resource for a search operation; determining, for native applications, native application scores, each native application score corresponding to a native application and being a measure of a relevance of the native application for the search operation; determining a first proper subset of the native applications, each of the native applications in the first proper subset of native application being a native application determined to have a corresponding web resource for the native application; determining, from the native application scores of the native applications in the first proper subset and from the web resource scores of the corresponding web resources for the native applications in the first proper subset, a normalization factor that adjusts the native application scores to a notionally common scale; applying the normalization factor to the native application scores to generate normalized native application scores; and ranking the web resources and the native applications based on the web resource scores and the normalized native application scores, the ranking being indicative of the relevance of each web resource and native application for the search operation relative to each other web resource and native application. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter allows the scoring an ranking of native application content against the content of web page resources, and thus provides users with additional search result options that may better satisfy the users' informational needs. Relevance and quality signals may be cross-attributed for web page resources and corresponding native applications. Such cross-attribution reduces deleterious scoring effects that may result from underserving of either the web page resource or the corresponding native application. Likewise, the cross-attribution can also account for poor quality of either the web page resource or corresponding native application.

In some implementations, normalization of a native application score relative to a web page resource score is not performed for web page resources and corresponding native applications that have relatively disparate scores in their respective scored corpus. This reduces the effect unnecessarily penalizing relatively high-quality web page resource that, for some reason, has a corresponding native application that is relatively low quality. This may occur, for example, when a new native application is released and requires frequent updates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system utilizes various signals to score information across multiple platforms, e.g., browser based web resource content and native application content, and then normalizes the scores for raking the information using a consistent scoring scheme. In some implementations, the system scores native applications based on the native application content and other signals, and normalizes the native application scores with web resource scores. The signals that are used can include global signals that are indicative of global relevance of information within a native application, and user device specific signals that are indicative of relevance of the native application for the user device.

The system receives web resource scores, each corresponding to a web resource and being a measure of a relevance of the web resource for a search operation. The system determines, for native applications, native application scores, each native application score corresponding to a native application and being a measure of a relevance of the native application for the search operation. Then for native applications that have corresponding web resource that has been scored, the native application scores are normalized to the web resource scores. Based on these normalizations, the system determines a common normalization factor and applies the normalization factor to the native applications scores of native applications that do not have corresponding web resources. The scored web resources and scored native applications are then ranked against one another accordingly.

In some implementations, the web resource scores and the native application scores are quality scores that are determined independent of a query. For example, the native application scores may be based on links from other resources to the native application or a resource from which the native application may be installed; the number of installations of the native application; semantic signals derived from user comments; etc. The web resource scores and the native application scores can be determined prior to query time and stored in respective web resource and native application indexes. The scores may then be normalized and combined with relevance scores that are based on the content of a particular query and the content of the web resources and native application scores. In other implementations, the web resource scores and the native application scores are search scores that are, at least in part, dependent on the query. For example, the search score may be a combination of a quality score and a relevance score. The search scores of the native applications are then normalized and the scored web resources and scored native applications are then ranked against one another accordingly.

Operation of the system that indexes application page data and the processing of search results for application pages is described in more detail below.

Figure 1:
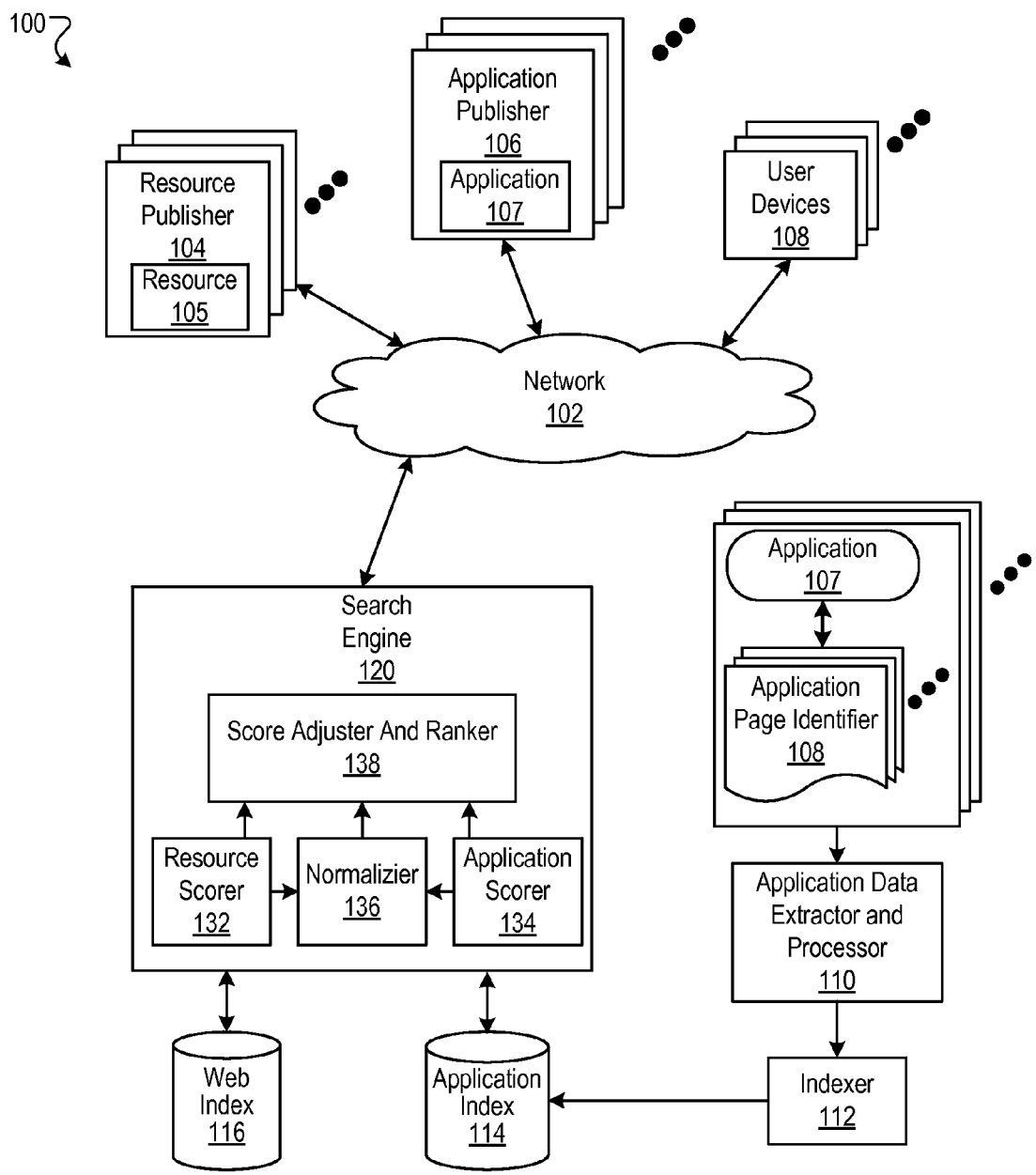
FIG. 1 is a block diagram of an example environment in which resource scores and native applications scores are normalized to a notionally common scale.

FIG. 1 is a block diagram of an example environment 100 in which application pages for native applications are indexed and searched. A computer network 102, such as the Internet, connects resource publisher websites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

As used in this specification, an "application page" is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 120 accesses a web index 112 and an application index 114. The web index 112 is an index of web resources 105 that has, for example, been built from crawling the publisher websites 104. The application index 114 is an index of application pages for native applications 107, and is constructed using an application data extractor and processor 110 and an indexer 112. Although shown as separate indexes, the web index 116 and the application index 114 can be combined in a single index.

The user devices 108 submit search queries to the search engine 120. In response to each query, the search engine 120 accesses the web index 112 and the application index 114 to identify resources and applications, respectively, that are relevant to the query. The search engine 120 implements a resource scorer 132 process to score web resources, and an application scorer process 134 to score native applications. A variety of appropriate search engine algorithms can be used to implement the resource scorer 132. Operation of the application scorer 134 is describe in more detail with reference to FIGS. 2 and 3 below.

The search 120 utilizes a normalizer 136 to normalize the native application scores to a notionally common scale with the web resource scores. The normalization is described in more detail with reference to FIGS. 2 and 3 below. After the scores are normalized, the search engine 120 ranks the web resources and search results against each other and identifies the resources and applications in the form of web resource search results and native application search results, respectively. Once generated, the search results are provided to the user device 108 from which the query was received.

A web resource search result is data generated by the search engine 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of application pages. A variety of functions can be invoked by the selection of an application search result. For example, selection of a native application search result may cause the native application to launch (if installed on the user device 108) and generate an instance of application page referenced in the application search result and that includes content that is relevant to the search query. Such a function is referred to as "deep linking" within the application search result.

Figure 2:
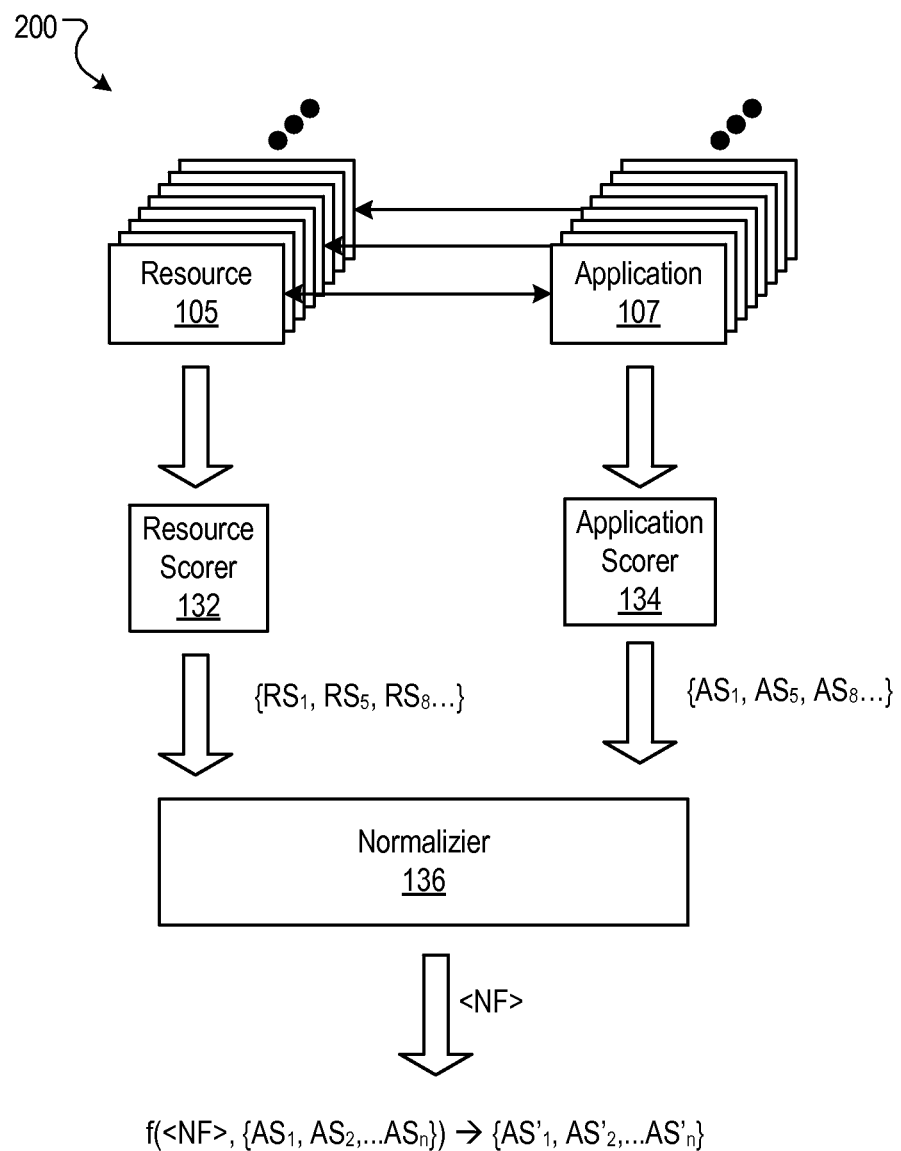
FIG. 2 is a system flow diagram of scoring and normalizing resource scores and native application scores.
Figure 3:
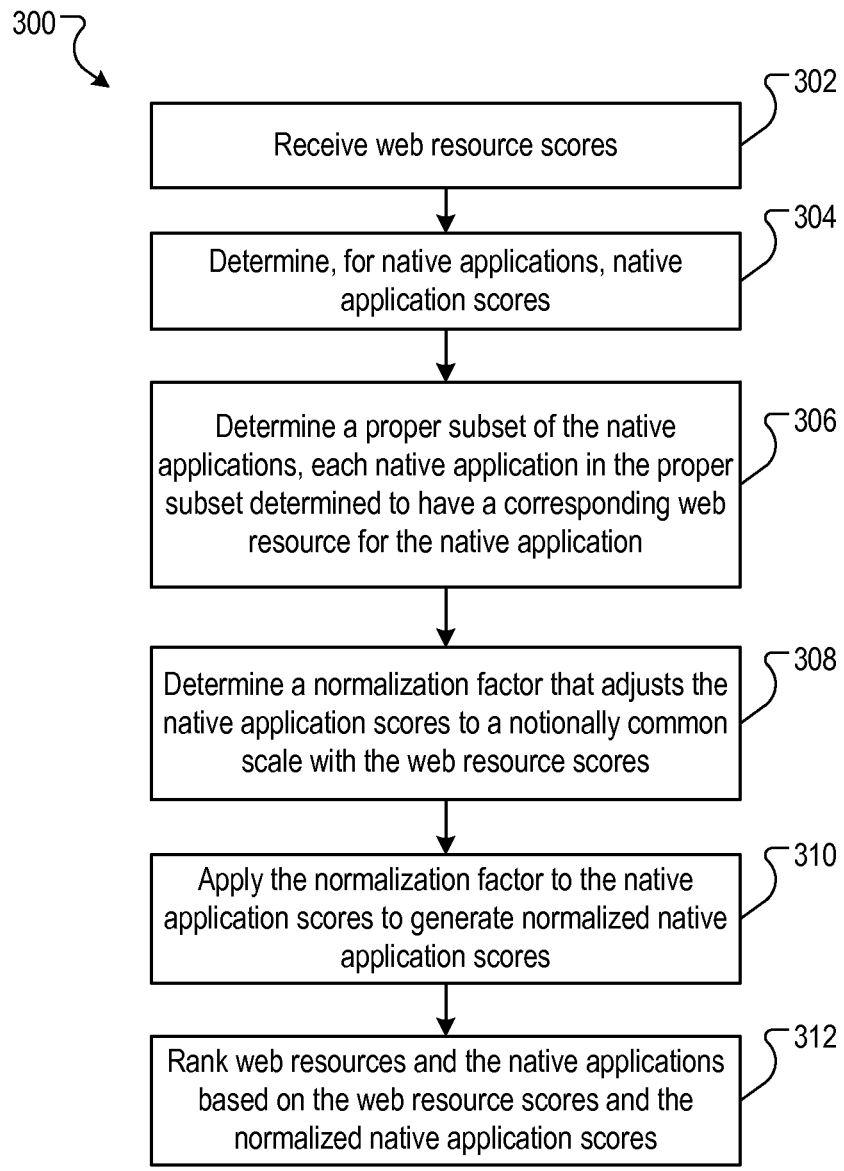
FIG. 3 is a flow diagram of an example process of scoring and normalizing resource scores and native application scores.

FIG. 2 is a system flow diagram 200 of scoring and normalizing resource scores and native application scores. The system flow diagram 200 is described with reference to FIG. 3, which is a flow diagram 300 of an example process of scoring and normalizing resource scores and native application scores. The process 300 can be implemented in a data processing apparatus of one or more computers that are in data communication.

The process 300 receives web resource scores (302). Each web resource score corresponds to a web resource and is a measure of a relevance of the web resource for a search operation. For example, the web resource score may be a quality score that is a measure of importance of a resource relative to other resources, or, alternatively, may be a relevance score that is a measure of relevance of the resource to a query. In the case of the latter, the relevance score may be based, in part, on the authority score. The process 300 may receive the scores from a component of the search engine, such as from the resource scorer 132.

The process 300 determines, for native applications, native application scores (304). Each native application score corresponds to a native application and is a measure of a relevance of the native application for the search operation. As with the resource scores, the native application scores may be a quality score or a relevance score. The search engine 120, using the application scorer 134, accesses the application index 114 to generate the application scores. In some implementations, the application scorer 134 may take into account global signals that are indicative of global relevance of information within a native application. Examples of such global signals include link data, installation data, usage data, ratings data, semantic signals data, keywords and text content, application recency, and cross-resource attribution. Other appropriate global signals can also be used.

Link data describes, in some implementations, the number and quality of links to the native application or to a web resource from which the native application can be installed. The quality of a link may be based on, for example, the quality of the web resource (or domain to which the web resource belongs) that includes the link.

Installation data describes the number of installations (or, alternatively, the number of downloads) of the native application. The link data can be aggregated from multiple different download resources. In some implementations, the number of downloads are partitioned by application type. For example, if a native application has both a smart phone version and a tablet version, then a separate download number is determined for each application. In other implementations, the number of downloads for each native application type can be aggregated to determine an overall native application download number. The links counted can also include application links from application pages of other native applications to the native application. Very high levels of downloads relative to other native applications can result in an increase in the native application score, while very low levels of downloads relative to other native applications can result in a decrease in the native application score.

Usage data describes the overall usage of the application. The overall usage may be based on a per-device or per-installation basis. Examples of usage information include time instantiated, engagement based on the number of application page views and user interactions, and other appropriate usage parameter values. Very high levels of usage relative to other native applications can result in an increase in the native application score, while very low levels of usage relative to other native applications can result in a decrease in the native application score.

Ratings data describes user ratings of the application. In some implementations, the ratings data are partitioned according to versions so that ratings of prior versions do not affect ratings of current versions. The ratings data can be gathered from resources from which the native application can be downloaded or otherwise describe the ratings data. Very positive ratings can result in an increase in the native application score, while very negative ratings can result in a decrease in the native application score. For example, "star" ratings and the like for a particular application can be collected from various sites and used in ranking the application.

Semantic signals data describes user sentiments regarding native applications. Semantic signals data can be determined, for example, by using sentiment detection processes on user input data, such as user reviews. Very positive sentiments can result in an increase in the native application score, while very negative sentiments can result in a decrease in the native application score.

Keywords and text content can be used to score native applications for specific keywords. The specific keywords can be, for example, a set of common and high frequency keywords, or, alternatively, can be keywords from a received query. A variety of appropriate relevancy algorithms can be used.

Native application recency describes how long the native application (or current version of the native application) has been released. Very recent applications may receive a scoring penalty or scoring cap (either positive and negative), while native applications that have been available a relatively longer time (e.g., more than a month) may not be subject to such penalties or caps.

Cross-resource attribution attributes relevance and quality signals for web page resources to corresponding native applications, and, optionally, quality signals for native applications to corresponding web-page resources. Such cross-attribution reduces deleterious scoring effects that may result from underserving of either the web page resource or the corresponding native application. Likewise, the cross-attribution can also account for poor quality of either the web page resource or corresponding native application. For example, if the data set for a particular native application is so small so as to be statistically unreliable, but its corresponding web resource has a statistically robust data set, then scores for the web site may be attributed to the application. The attribution may be scaled based on the statistics of the data sets. For example, as the data set for the application becomes larger and more reliable, the attribution from the web site to application my likewise scale from 100% down to 0%.

In some implementations, the application scorer 134 may also take into account user device specific signals that are indicative of relevance of the native application for a user device. User device specific signals can, for example, be taken into account at query time. Examples of user device specific signals include installation status, instantiation status, use frequency, and application stability. Other appropriate user device specific signals can also be used.

Installation status is determined from whether a user device has a particular native application installed on the user device. If a native application is installed, the system may increase the relevance of the application for that particular user device relative to other user devices that do not have the native application installed.

Instantiation status is determined from whether a user device has a particular native application that is installed running on the user device. If a native application is running, the system may increase the relevance of the application.

Use frequency describes how frequently over a given period of time a user device uses the native application. As the use frequency increases, the system increases the relevance of the native application for the particular user device.

Application stability describes how stable the native application is on the user device. Native applications that tend to crash, freeze or experience other errors on a particular user device are determined to be less relevant than for another user device for which the native application exhibits better stability. The stability may be affected by the user device operating system, or by other applications that may interfere with the native application.

The process 300 determines a proper subset of native applications, each native application in the proper subset determined to have a corresponding web resource for the native application (306). As used herein, a corresponding web resource is a resource that provides the same or similar function and/or provides the same or similar information as the native application. For example, a weather website may provide weather data and forecasts, and may have a corresponding native application that provides the same data and forecasts. Likewise, a movie database website may provide information for movies, and may have corresponding native applications that provide the same data. Because some of the native applications may not have corresponding websites, a proper subset of the native applications are identified. The normalizer 136 may be configured to identify the corresponding web resources. The corresponding web resource addresses may be stored in the application index 114, for example, and the normalizer 136 accesses the index 114 to determine a corresponding web resource for a native application. As indicated in FIG. 2 by the arrows between the native applications 107 and the resources 105, a proper subset of native applications 107 have corresponding resources 105.

The process 300 determines, from the native application scores of the native applications in the first proper subset and from the web resource scores of the corresponding web resources for the native applications in the first proper subset, a normalization factor that adjusts the native application scores to a notionally common scale (308). For example, the normalizer receives the web resource scores $\{RS_1, RS_5, RS_8 \ldots\}$ and the corresponding application scores $\{AS_1, AS_5, AS_8 \ldots\}$. The normalizer 136 can use a variety of appropriate processes to normalize the scores. For example, the normalizer 136 can linearly regress the native application scores as a variable dependent on the corresponding web scores. A variety of appropriate linear regression techniques can be used. In another implementation, each native application score can be represented based on various signals and corresponding weights, and the weights can be adjusted using a machine learning process. The normalization factor NF in this implementation is thus a weighted vector.

The process 300 then applies the normalization factor to the native application scores to generate normalized native application scores (310). For example, as depicted in FIG. 2, the normalizer 136 adjusts the application scores $\{AS_1, AS_2, AS_3 \ldots\}$ to the adjusted scores $\{AS'_1, AS'_2, AS'_3 \ldots\}$.

The process 300 then ranks the web resources and the native applications based on the web resource scores and the normalized native application scores (312). The ranking being indicative of the relevance of each web resource and native application for the search operation relative to each other web resource and native application. Because the resulting scores $\{AS'_1, AS'_2, AS'_3 \ldots\}$ and $\{RS_1, RS_2, RS_3 \ldots\}$ are notionally common, the resources and native applications can be ranked against each other.

Figure 4:
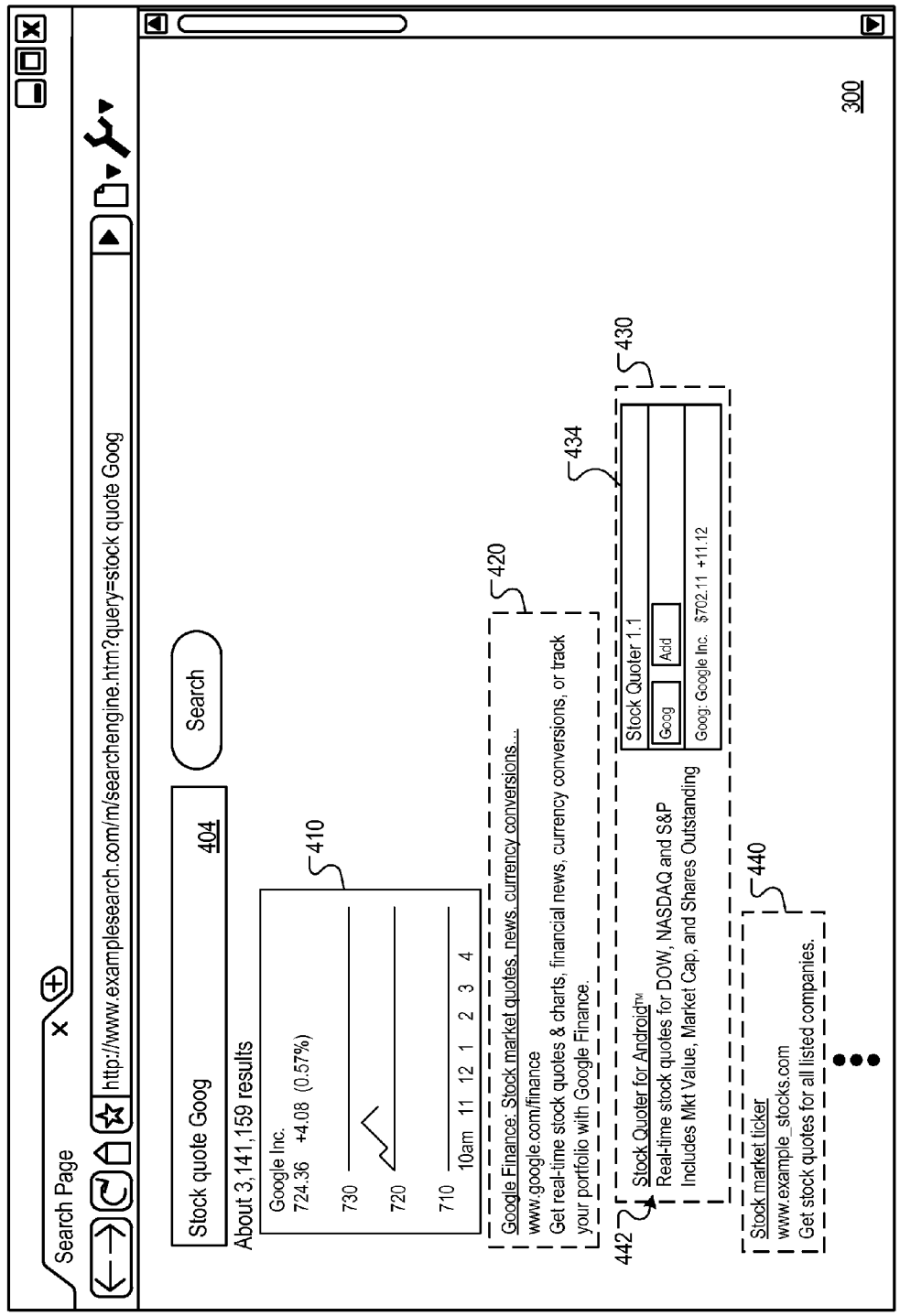
FIG. 4 is an illustration of a search results page including a native application search result.

FIG. 4 is an illustration of a search results page 400 that includes a native application search result for a native application ranked against web resources. Displayed in the search results page 400 are search results 410, 420, 430, and 440 that are responsive to the query "Stock quote Goog" displayed in the search input field 404. The search result 410 is a real time search result that is generated, for example, in part from a real time feed. The search results 420 and 440 are web search results generated in response to a search of a web index 112 of resources. Each search result 420 and 440 references a resource that can be rendered in a browser application on a user device and includes a link to the resource, and other data, such as a snippet of text extracted for the referenced resource.

The search result 430 is a native application search result that is generated in response to a search of the application index 114 of application pages. The search result 430 may include, for example, a snippet 432 of text and an image 434 of an application page. The snippet 434 may include, for example, the name of the native application (Stock Quoter for Andriod™) and text that has been extracted from one or more application pages of the native application. Additional text can also be included, such as text from metadata.

The image 434 may be, for example, an image of a rendered application page. In some implementations, multiple images for a particular application page may be stored, and the image that is most relevant to the query may be selected. For example, as show in FIG. 4 the image 434 includes an image for a stock quote for the Goog symbol, and the image is selected because the search query specifies the Goog symbol.

In some implementations, selection of the image 434 at the user device causes the native application to launch and generate an instance of the application page that includes content that is relevant to the search query. For example, provided the native application Stock Quoter for Andriod™ is installed on the user device, selecting the image 434 causes the native application to launch and generate the application page that corresponds to the image 434. Furthermore, the application page is rendered to display the current stock quote for the Goog symbol. This can be accomplished, for example, by passing the input value of Goog in a command line for the native application. If, on the other hand, the native application is not installed, then selection of the image 434 may cause the user device 108 to display a web page resource at which the particular native application may be downloaded and installed on the user device 108.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   receiving, by the data processing apparatus, web resource scores, each web resource score corresponding to a web resource and being a measure of a relevance of the web resource for a search operation;
   determining, for native applications, native application scores, each native application score corresponding to a native application and being a measure of a relevance of the native application for the search operation;
   determining a first proper subset of the native applications, each of the native applications in the first proper subset of native application being a native application determined to have a corresponding web resource for the native application;
   determining, from the native application scores of the native applications in the first proper subset and from the web resource scores of the corresponding web resources for the native applications in the first proper subset, a normalization factor that adjusts the native application scores to a notionally common scale;
   applying the normalization factor to the native application scores to generate normalized native application scores; and
   ranking the web resources and the native applications based on the web resource scores and the normalized native application scores, the ranking being indicative of the relevance of each web resource and native application for the search operation relative to each other web resource and native application.

2. The computer-implemented method of claim 1, wherein determining a normalization factor that adjusts the native application scores to a notionally common scale comprises linearly regressing the native application scores as variable dependent on the corresponding web scores.

3. The computer-implemented method of claim 1, wherein determining a native application score comprises, for each native application:
   determining a number of links to the native application; and
   determining, for each of the links, a quality score for the link; and
   generating the native application score base, in part, on the number of links to the native application and the quality scores for the links.

4. The computer-implemented method of claim 3, wherein the links include application links from application pages of other native applications to the native application.

5. The computer-implemented method of claim 3, wherein the links include web links from web resources to the native application.

6. The computer-implemented method of claim 1, wherein determining a native application score comprises, for each native application:
   determining, for each the applications, a number of downloads of the application; and
   generating the native application score based, in part, on the number of downloads of the native application.

7. The computer-implemented method of claim 1, wherein determining a native application score comprises, for each native application:
   selecting application page data of pages of the native application from an index of application pages, the application page data describing the content of each application page; and
   generating the native application score based, in part, on the application page data and a search query.

8. The computer-implemented method of claim 1, wherein determining a native application score comprises, for each native application:
   determining device specific data for a user device from which a search query was received; and
   generating the native application score based, in part, on the device specific data.

9. The computer-implemented method of claim 8, wherein determining device specific data for a user device comprises:
   determining data describing whether the native application is installed on the user device; and
   determining data describing frequency of use of the native application on the user device.

10. A system, comprising:
    a data processing apparatus; and
    software stored in non-transitory computer readable storage medium storing instructions executable by the data processing apparatus and that upon such execution cause the data processing apparatus to perform operations comprising:
    receiving web resource scores, each web resource score corresponding to a web resource and being a measure of a relevance of the web resource for a search operation;
    determining, for native applications, native application scores, each native application score corresponding to a native application and being a measure of a relevance of the native application for the search operation;
    determining a first proper subset of the native applications, each of the native applications in the first proper subset of native application being a native application determined to have a corresponding web resource for the native application;
    determining, from the native application scores of the native applications in the first proper subset and from the web resource scores of the corresponding web resources for the native applications in the first proper subset, a normalization factor that adjusts the native application scores to a notionally common scale;
    applying the normalization factor to the native application scores to generate normalized native application scores; and
    ranking the web resources and the native applications based on the web resource scores and the normalized native application scores, the ranking being indicative of the relevance of each web resource and native application for the search operation relative to each other web resource and native application.

11. The system of claim 10, wherein determining a normalization factor that adjusts the native application scores to a notionally common scale comprises linearly regressing the native application scores as variable dependent on the corresponding web scores.

12. The system of claim 10, wherein determining a native application score comprises, for each native application:
    determining a number of links to the native application; and determining, for each of the links, a quality score for the link; and generating the native application score base, in part, on the number of links to the native application and the quality scores for the links.

13. The system of claim 11, wherein the links include application links from application pages of other native applications to the native application.

14. The system of claim 12, wherein the links include web links from web resources to the native application.

15. The system of claim 10, wherein determining a native application score comprises, for each native application:

determining, for each the applications, a number of downloads of the application; and generating the native application score based, in part, on the number of downloads of the native application.

16. The system of claim 10, wherein determining a native application score comprises, for each native application:

selecting application page data of pages of the native application from an index of application pages, the application page data describing the content of each application page; and generating the native application score based, in part, on the application page data and a search query.

17. The system of claim 10, wherein determining a native application score comprises, for each native application:

determining device specific data for a user device from which a search query was received; and generating the native application score based, in part, on the device specific data.

18. The system of claim 17, wherein determining device specific data for a user device comprises:

determining data describing whether the native application is installed on the user device; and determining data describing frequency of use of the native application on the user device.

19. A non-transitory computer readable storage medium storing instructions executable by a data processing apparatus and that upon such execution cause the data processing apparatus to perform operations comprising:

receiving web resource scores, each web resource score corresponding to a web resource and being a measure of a relevance of the web resource for a search operation;

determining, for native applications, native application scores, each native application score corresponding to a native application and being a measure of a relevance of the native application for the search operation;

determining a first proper subset of the native applications, each of the native applications in the first proper subset of native application being a native application determined to have a corresponding web resource for the native application;

determining, from the native application scores of the native applications in the first proper subset and from the web resource scores of the corresponding web resources for the native applications in the first proper subset, a normalization factor that adjusts the native application scores to a notionally common scale;

applying the normalization factor to the native application scores to generate normalized native application scores; and ranking the web resources and the native applications based on the web resource scores and the normalized native application scores, the ranking being indicative of the relevance of each web resource and native application for the search operation relative to each other web resource and native application.

* * * * *